US010754746B2

(12) United States Patent
Berner et al.

(10) Patent No.: US 10,754,746 B2
(45) Date of Patent: Aug. 25, 2020

(54) VIRTUAL PROCESSOR ENABLING UNOBTRUSIVE OBSERVATION OF LEGACY SYSTEMS FOR ANALYTICS IN SOC

(71) Applicant: General Electric Company, Schenectady, NY (US)

(72) Inventors: Andrew William Berner, Waterford, NY (US); Tab Mong, Erie, PA (US); Richard Gawrelski, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 119 days.

(21) Appl. No.: 15/813,479

(22) Filed: Nov. 15, 2017

(65) Prior Publication Data
US 2019/0146821 A1    May 16, 2019

(51) Int. Cl.
*G06F 11/30* (2006.01)
*G06F 9/455* (2018.01)
(Continued)

(52) U.S. Cl.
CPC .......... *G06F 11/3013* (2013.01); *G05B 23/00* (2013.01); *G06F 9/45558* (2013.01);
(Continued)

(58) Field of Classification Search
CPC ............. G06F 9/45558; G06F 11/3003; G06F 11/3452; G06F 11/008; G06F 11/0754;
(Continued)

(56) References Cited

U.S. PATENT DOCUMENTS 6,049,861 A    4/2000  Bird et al.
6,665,862 B2  12/2003  Isman et al.
(Continued)

OTHER PUBLICATIONS

Sunderam, V.S. et al., "The PVM concurrent computing system: Evolution, experiences, and trends", Parallel Computing, vol. 20, Issue 04, Apr. 1994, http://www.sciencedirect.com/science/article/pii/0167819194900272, (pp. 531-545, 15 total pages).
Skillicorn, David et al., "Models and Languages for Parallel Computation", ACM Computing Surveys (CSUR), http://dl.acm.org/citation.cfm?id=280278, vol. 30, Issue 02, Jun. 1998, (pp. 123-169, 47 total pages).
(Continued)

*Primary Examiner* — Jacob D Dascomb
(74) *Attorney, Agent, or Firm* — Buckley, Maschoff & Talwalkar LLC (57) ABSTRACT

The example embodiments are directed to a system and method for a virtual processor that enables unobtrusive observation of legacy systems for analytics in a system-on-chip (SoC) environment. In one example, the method includes implementing a virtual processor in field programmable gate array (FPGA) programmable logic, the virtual processor comprising a virtual version of a target system, capturing one or more operational parameters in volatile memory of the virtual processor using an access controller configured to provide direct access to the volatile memory of the virtual processor, streaming the one or more operational parameters to the embedded processor, storing the one or more operational parameters in volatile memory of the embedded processor, and performing in-situ monitoring using the one or more operational parameters.

20 Claims, 4 Drawing Sheets

(51) Int. Cl.
*G06F 11/34* (2006.01)
*G06F 16/2458* (2019.01)
*G05B 23/00* (2006.01)
*G06F 15/78* (2006.01)
*G06F 11/00* (2006.01)
*G06F 11/07* (2006.01)

(52) U.S. Cl.
CPC ...... *G06F 11/3003* (2013.01); *G06F 11/3058* (2013.01); *G06F 11/3089* (2013.01); *G06F 11/3452* (2013.01); *G06F 15/7867* (2013.01); *G06F 16/2465* (2019.01); *G06F 11/008* (2013.01); *G06F 11/0754* (2013.01); *G06F 2009/45591* (2013.01); *G06F 2201/815* (2013.01)

(58) Field of Classification Search
CPC ..... G06F 2009/45591; G06F 2201/815; G06F 16/2465; G06F 11/3058; G06F 11/3013; G06F 11/3089; G06F 15/7867; G05B 23/00
See application file for complete search history.

(56) References Cited

U.S. PATENT DOCUMENTS

| | | |
|---|---|---|
| 8,321,849 B2 | 11/2012 | Nickolls et al. |
| 9,098,652 B2 | 8/2015 | Kostick et al. |
| 9,563,670 B2 | 2/2017 | Wasson et al. |
| 9,753,782 B2* | 9/2017 | Fang .................... H04L 67/1008 |
| 2013/0205028 A1 | 8/2013 | Crockett et al. |
| 2016/0098291 A1 | 4/2016 | Kondaveeti et al. |
| 2018/0260342 A1* | 9/2018 | Thangaraj ............... G06F 13/36 |
| 2018/0267878 A1* | 9/2018 | Guim Bernat ...... G06F 11/3409 |
| 2019/0095309 A1* | 3/2019 | Levit-Gurevich ........................... G06F 11/3409 |
| 2019/0141295 A1* | 5/2019 | Lazar ..................... H04N 7/183 |

OTHER PUBLICATIONS

Youssfi, Mohamed et al., "A new massively parallel and distributed virtual machine model using mobile agents", Multimedia Computing and Systems, http://ieeexplore.ieee.org/document/6911306/, Sep. 29, 2014, 8pgs.

* cited by examiner

VIRTUAL PROCESSOR ENABLING UNOBTRUSIVE OBSERVATION OF LEGACY SYSTEMS FOR ANALYTICS IN SOC

BACKGROUND

Machine and equipment assets are engineered to perform particular tasks as part of a business process. For example, assets can include, among other things and without limitation, industrial manufacturing equipment on a production line, drilling equipment for use in mining operations, wind turbines that generate electricity on a wind farm, transportation vehicles, and the like. As another example, assets may include devices that aid in diagnosing patients such as imaging devices (e.g., X-ray or MRI systems), monitoring equipment, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increasing sensor capabilities, and decreasing sensor costs, as well as the proliferation of mobile technologies, have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

Sensor are widely used in industrial settings to monitor the condition of associated machinery and operations thereof. It may be advantageous to provide the ability to perform descriptive, diagnostic, and predictive data analytics and/or other such operations on the sensors. Often, however, machine faults are not detected until a complete failure of one or more devices occurs. Previous methods of detecting damage to assets could not detect intermittent damage or determine the extent of the damage.

It may be desirable to detect damage to assets when it first occurs and be able to immediately identify the damaged asset. It may also be desirable to measure the performance of an asset in situ without removing the asset from operation. Also, as technology develops, it may be desirable to emulate one or more hardware devices in software. One such situation arises when hardware and/or software becomes outdated (referred to as legacy hardware or code), but the older hardware is needed to perform the analytics.

In the conventional way of troubleshooting an asset when damage is known to have occurred, it is necessary to attach probes and extensions to the asset (e.g., locomotive, wind turbine, etc.). Typically, fault words are stored in a log and a user would need to approach the device and plug in to read the log, which does not provide analytics information. This is cumbersome, time consuming, and labor intensive. User visibility and insight into the status of the asset using conventional troubleshooting methods is also limited.

SUMMARY

Embodiments described herein improve upon the prior art by providing systems and methods which enable unobtrusive observation of legacy systems for data analytics and other such operations in a system previously incapable of such observations. Rather than using an additional external component (e.g., probes, hook-up boxes, etc.), the inventors have developed an application coupled to an analytics engine which leverages existing hardware and capabilities within a product (e.g., legacy system). The application coupled to the analytics engine provides for complete observation in situ of processor based control systems data and operational performance without changing existing software. To facilitate backward compatibility (e.g., allowing for interoperability with an older legacy system, or with input designed for such as system), older generations of hardware are emulated using software.

"In Situ" means in place, translating literally to "on site" or "in position." In computer science, an in situ operation is one that occurs without interrupting the normal state of a system. For example, an analytics operation may be performed over a running system, without needing to take the system down to perform the analytics or other such operation. Thus, as used herein, the term "in situ" includes reference to analytics capabilities that exist in the actual product/design.

Among other advantages, the resulting system may be accessed and turned on at any time (e.g., via Ethernet or other type of communications medium) to perform on-the-fly (real time) monitoring/analytics, even on legacy systems. User visibility and insight into the status of an asset may be optimized. Machine faults are reduced and maintenance is convenient. Meanwhile, the virtual environment is invisible to the environment within the legacy system (running on the same computer).

In some examples, the embodiments herein may be incorporated within software that is deployed on a cloud platform for use with an Industrial Internet of Things (IIoT) system.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The disclosed embodiments relate to a virtual processor enabling unobtrusive observation of legacy systems for analytics in a system-on-chip (SoC) environment.

The concept of a virtual processor, or soft processor, is known, but prior systems did not provide for complete observability without modifying existing codebase. Using a virtual version of an existing processor control (e.g., processors, memories, controllers, etc.), with field programmable gate array (FPGA) or application-specific integrated circuits (ASIC) logic, the example embodiments add data paths and signals that enable the parallel processing system to capture and record any and all contents of any memory location in any memory device, any software instructions, and any exceptions (e.g., interrupts and errors).

The technical effect is provided by a virtual processor which provides the ability to completely capture all system data to create/derive a complete model of an existing system from legacy hardware for use for various analytics purposes in a parallel processing system. The parallel processing system uses the captured information to create/derive a complete model of the observed system without any modification of the operation of that system. The model of the original system may be used to perform analytics that were unavailable in the baseline version of the system.

Figure 1:
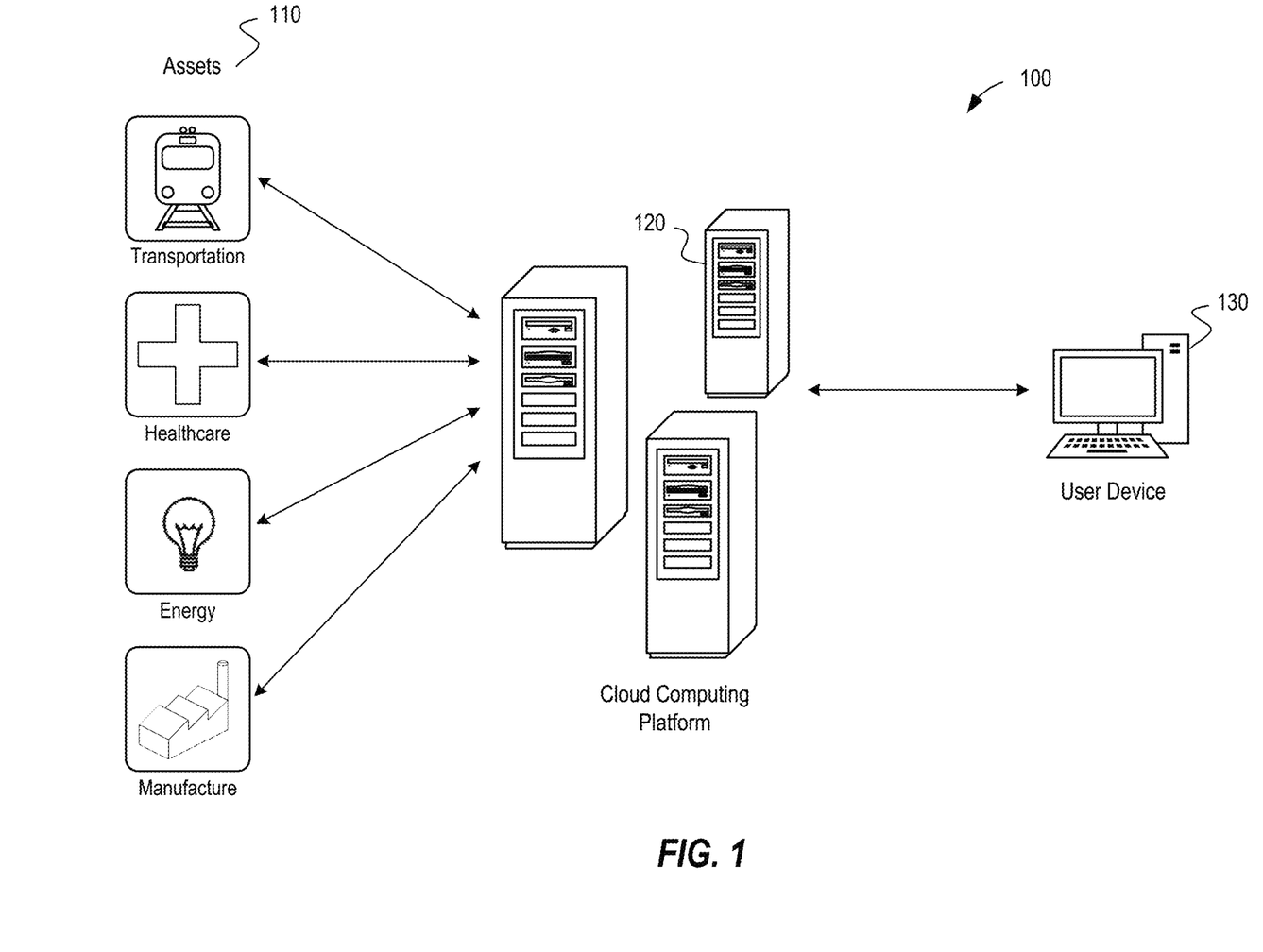
FIG. 1 is a diagram illustrating a cloud computing environment in accordance with an example embodiment.

FIG. 1 illustrates a cloud computing system 100 for industrial software and hardware in accordance with an example embodiment. Referring to FIG. 1, the system 100 includes a plurality of assets 110 which may be included within an Industrial Internet of Things (IIoT) and which may transmit raw data to a source such as cloud computing platform 120 where it may be stored and processed. It should also be appreciated that the cloud platform 120 in FIG. 1 may be replaced with or supplemented by a non-cloud platform such as a server, an on-premises computing system, and the like. Assets 110 may include hardware/structural assets such as machine and equipment used in industry, healthcare, manufacturing, energy, transportation, and that like. It should also be appreciated that assets 110 may include software, processes, resources, and the like.

The data transmitted by the assets 110 and received by the cloud platform 120 may include data that is being input to hardware and/or software deployed on or in association with the assets 110, raw time-series data output as a result of the operation of the assets 110, and the like. Data that is stored and processed by the cloud platform 120 may be output in some meaningful way to user devices 130. In the example of FIG. 1, the assets 110, cloud platform 120, and user devices 130 may be connected to each other via a network such a public network (e.g., Internet), a private network, a wired network, a wireless network, etc. User devices 130 may interact with software hosted by and deployed on the cloud platform 120 in order to receive data from and control operation of the assets 110.

It should be appreciated that the system 100 is merely an example and may include additional devices and/or one of the devices shown may be omitted.

According to various aspects, software applications that can be used to enhance or otherwise modify the operating performance of an asset 110 may be hosted by the cloud platform 120 and may operate on the asset 110. For example, software applications may be used to optimize a performance of the assets 110 or data coming in from the asset 110. As another example, the software applications may analyze, control, manage, or otherwise interact with the asset 110 and components (software and hardware) thereof. A user device 130 may receive views of data or other information about the asset 110 as the data is processed via one or more applications hosted by the cloud platform 120. For example, the user device 130 may receive graph-based results, diagrams, charts, warnings, measurements, power levels, and the like.

In this example, an asset management platform (AMP) can reside within or be connected to the cloud platform 120, in a local or sandboxed environment, or can be distributed across multiple locations or devices and can be used to interact with the assets 110. The AMP can be configured to perform functions such as data acquisition, data analysis, data exchange, and the like, with local or remote assets 110, or with other task-specific processing devices. For example, the assets 110 may be an asset community (e.g., turbines, healthcare, power, industrial, manufacturing, mining, oil and gas, elevator, etc.) which may be communicatively coupled to the cloud platform 120 via one or more intermediate devices such as a stream data transfer platform, database, or the like.

Information from the assets 110 may be communicated to the cloud platform 120. For example, external sensors can be used to sense information about a function of an asset, or to sense information about an environment condition at or around an asset, a worker, a downtime, a machine or equipment maintenance, and the like. The external sensor can be configured for data communication with the cloud platform 120 which can be configured to store the raw sensor information and transfer the raw sensor information to the user devices 130 where it can be accessed by users, applications, systems, and the like, for further processing. Furthermore, an operation of the assets 110 may be enhanced or otherwise controlled by a user inputting commands though an application hosted by the cloud platform 120 or other remote host platform such as a web server. The data provided from the assets 110 may include time-series data or other types of data associated with the operations being performed by the assets 110.

In some embodiments, the cloud platform 120 may include a local, system, enterprise, or global computing infrastructure that can be optimized for industrial data workloads, secure data communication, and compliance with regulatory requirements. The cloud platform 120 may include a database management system (DBMS) for creating, monitoring, and controlling access to data in a database coupled to or included within the cloud platform 120. The cloud platform 120 can also include services that developers can use to build or test industrial or manufacturing-based applications and services to implement IIoT applications that interact with assets 110.

For example, the cloud platform 120 may host an industrial application marketplace where developers can publish their distinctly developed applications and/or retrieve applications from third parties. In addition, the cloud platform 120 can host a development framework for communicating with various available services or modules. The development framework can offer developers a consistent contextual user experience in web or mobile applications. Developers can add and make accessible their applications (services, data, analytics, etc.) via the cloud platform 120. Also, analytic software may analyze data from or about a manufacturing process and provide insight, predictions, and early warning fault detection.

Figure 2:
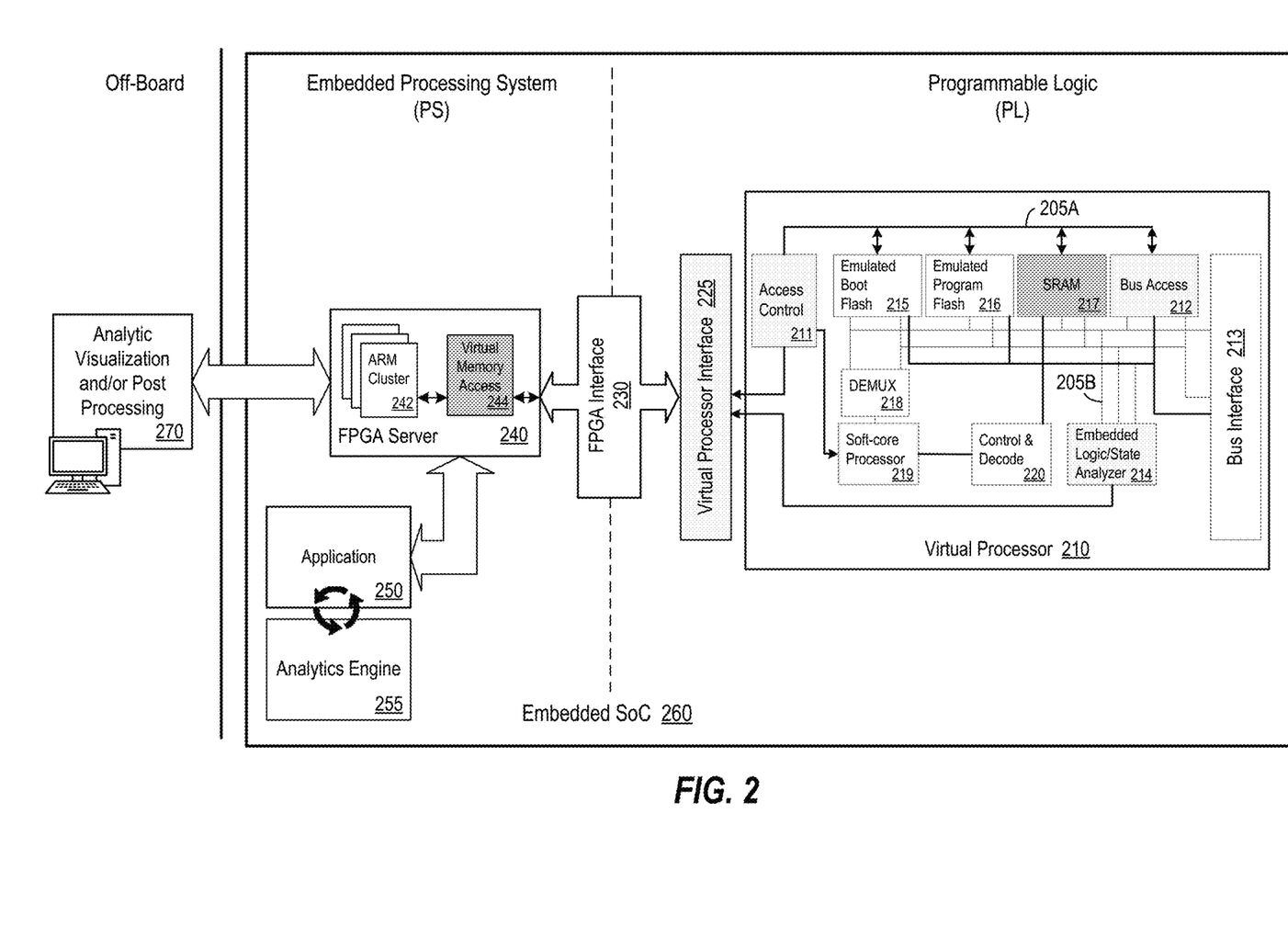
FIG. 2 is a block diagram illustrating a system-on-chip (SoC) design in accordance with an example embodiment.
Figure 3:
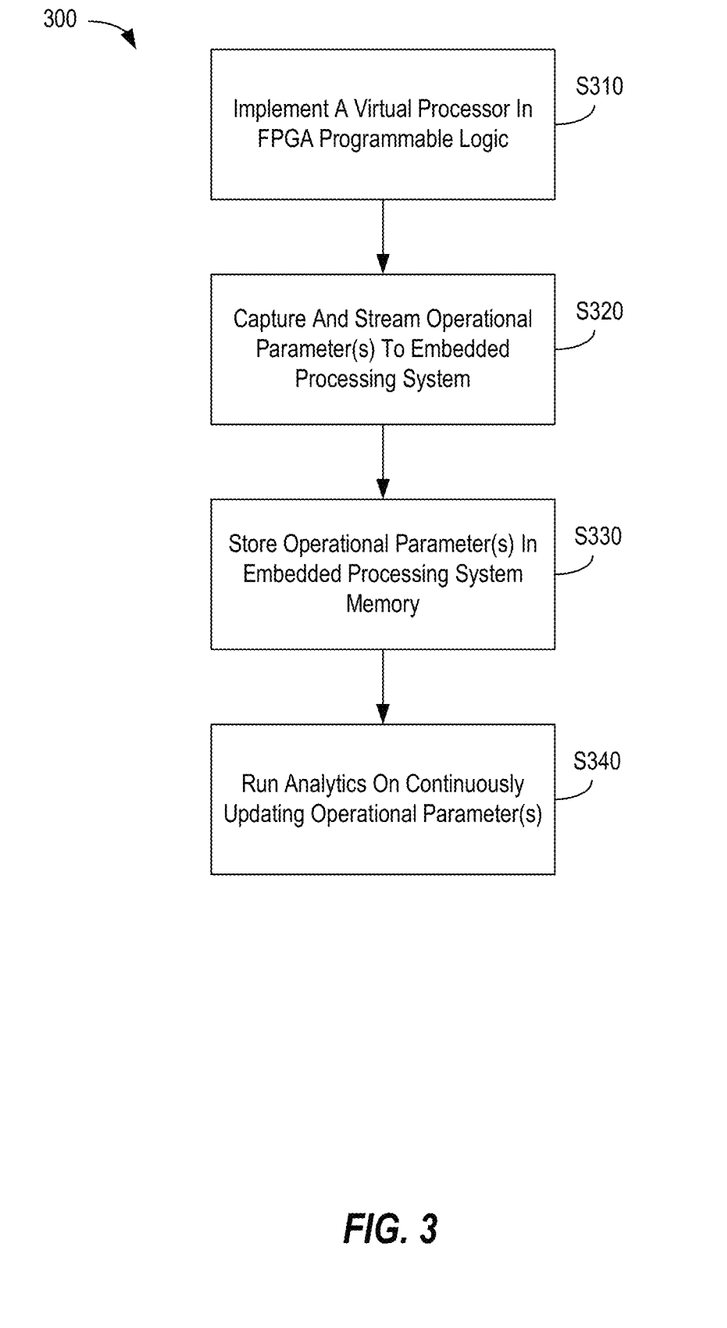
FIG. 3 is a flow chart illustrating a process that may be performed according to aspects of the present disclosure in the system of FIG. 2.

Reference is now made to FIGS. 2 and 3, which will be discussed together. FIG. 2 illustrates of a system-on-chip (SoC) design 260, which may be a field programmable SoC, in accordance with an example embodiment. In some embodiments, the system 260 may also be implemented in other integrated circuit technologies such as in application-specific integrated circuits (ASICs). FIG. 3 illustrates a process 300 that may be performed according to aspects of the present disclosure in the system of FIG. 2.

As shown in FIG. 2, embedded SoC 260 may comprise a processing system ("PS") side and a programmable logic ("PL") side. The PS side comprises the processor portion (in this example an ARM-based processor portion), which includes ARM-based processor(s) hosting a (FPGA) server 240 and application 250 coupled to FPGA logic (e.g., FPGA hardware definition language (HDL)). The PL side comprises the FPGA portion, which includes a virtual processor 210 (e.g., virtual machine/computer) coupled to virtual processor interface 225. An FPGA interface device 230 is coupled between the PS side and the PL side. In some embodiments, FPGA interface 230 may be an Advanced eXtensible Interface (AXI) Interconnect device. The PS side and the PL side form a single SoC component 260 or equivalent.

On the PS side, the processor cores 242 (e.g., an ARM cluster) may implement a FPGA server 240. For example, the ARM cores may be a quad-core ARM Cortex-A53 processor, or another type of processor. ARM cluster 242 has access to a memory map of virtual memory access device 244. Virtual memory access device 244 emulates all or part of the memory of internal RAM in the FPGA portion of the embedded SoC 206 (e.g., SRAM 217).

Application 250 is an independent application that continuously creates a memory map duplicate of desired operational (monitor) parameter(s) of SRAM 217. The desired operational parameter(s) are the key variables that a user wishes to tap into and analyze (e.g., currents, fault monitors, condition of assets, etc.). The operational parameter(s) are stored in virtual memory access device 244 on the PS side and are dynamically and continuously updated (and replaced by new information) based on, for example, the latest copy of the operational parameter(s) of the SRAM 217 to run analytics on. In some embodiments, application 250 generates a duplicate (minor image) of the SRAM 217.

Application 250 together with the analytics engine 255 may monitor the status of an asset being tracked. Monitoring of the asset status may include, for example, monitoring machine parameters such as temperatures, voltage levels, speeds, fluid levels, or the like (e.g., to detect a variation such as overcurrent or overtemperature before complete machine failure).

Analytics engine 255 runs on the constantly updated application 250 to provide long term trending information (signatures/patterns) and other outcomes. This information gives users an indication of how a system is running at any given time. In some embodiments, analytics engine 255 may provide maintenance-related and prognostic-related alerts. For example, analytics engine 225 may provide diagnostic information on the health of assets and alert staff (e.g., maintenance personnel) to trends/anomalies that may be developing into failures or faults in the assets. This information can be used to schedule maintenance activities before the problem escalates and results in major failure or damage to the asset.

On the PL side, virtual processor 210 is a FPGA HDL and software logical implementation of a computer system. In virtual processor 210, hardware components of a computer are emulated (e.g., virtualized) in register transfer logic (RTL) in ASIC or FPGA fabric. The operation of the hardware device is emulated in the logical representation of the targeted legacy processor (in this case the Intel® 80186 microprocessor 219).

As shown in FIG. 3, a process 300 that may be performed according to aspects of the present disclosure beings at S310, where a virtual processor that is enables unobtrusive observation of legacy systems is implemented in FPGA programmable logic.

Virtual processor 210 comprises existing functionalities that are part of an older generation of hardware (e.g., legacy hardware/system), including soft-core processor 219 (e.g., Intel® 80186), virtual system memory including boot flash memory 215, program flash memory 216, static random-access memory (SRAM) 217, data demultiplexer (DEMUX) 218, control and decode logic 220, and bus interface device 213, all of which are implemented in software to emulate the corresponding components of an actual computer.

Virtual processor 210 according to an embodiment advantageously also comprises, or is connected to, conduit features (e.g., shaded components in FIG. 2) not originally part of the legacy system that allow users to tap into the emulated system (e.g., legacy system) described above. The conduit features include virtual processor interface 224, access controller 211, bus access device 212, and an embedded logic/state analyzer 214 (such as Xilinx's® ChipScope™).

Access controller 211 is a customized function that allows a user to access any memory location of virtual processor 210, for example, boot flash memory 215, program flash memory 216, SRAM 217, directly from an ARM processor on the PS side without affecting aspects of virtual processor 210. For example, a user can access virtual system memories 215, 216, 217 directly, without going through soft-core processor 219 or other functional units of virtual processor 210, to read and write data. In some embodiments, internal registers of soft-core processor 219 may be accessed directly as well.

Bus access device 212 provides direct access to the rest of the virtual processing system 210. Bus access device 212 allows an ARM system on the PS side to directly access buses on the PL side without adversely affecting the processor 219. For example, users may "peek and poke" into memory or registers of system 210 via a set of buses 205A (illustrated by bolded lines), at any time (e.g., as it is running) without adversely affecting the operation of the system 210. Advantageously, bus lines 205A allow a user to tap into memories 215, 216, 217 and into the soft-core processor 219, and pull data from those memories or registers as it is running via a set of buses 205B (illustrated by the unbolded lines). These integrated capabilities were not previously possible using the older hardware. Data may be written into bus access device 212 without halting or interfering with processor 219.

In some embodiments, an integrated logic analyzer 214 may be used to sample data from the running on-chip design. The logic analyzer allows probing of internal signals of a design inside an FPGA (e.g., FPGA nets/wires). For example, the logic analyzer may be used to retrieve output data from DEMUX 218, processor 219, control and decode 220, etc., analyze the data, and stream the data to the PS side via virtual processor interface 225 and FPGA interface 230. In some embodiments, signals are captured in the system at the speed of operation and brought out through the programming interface. Captured signals may be displayed and analyzed using an analyzer tool 214.

In some embodiments, a direct memory access (DMA) engine in ARM cluster 242 is used to control the direct transfer of data between different memories from a data source and data destination via a DMA channel. The DMA engine may include, in part, a DMA controller, an associated memory buffer, and one or more first-in-first out (FIFO) buffers accepting data transfer requests from the PL side. DMA control logic on the PL side is controlled by software on the PS side.

At S320, the DMA engine may be configured to capture and stream operational parameter(s) from the memory of internal RAM in the FPGA portion of the embedded SoC 206 (e.g., SRAM 217) over to memory on the PS side using bus access device 212 via DMA channel. Meanwhile, advantageously, the operational parameter(s) stored on the PS side are continuously being updated to create a duplicate (minor image) of virtual processor data (e.g., data in SRAM 217).

Virtual processor 210 may be implemented as entirely software and timing compatible with existing software. In some embodiments, data may be sampled at a sampling rate of the virtual processor CPU 219. This software-based emulation system 210 provides for complete observability and controllability of all nodes within the system (e.g., data, software operations, system states, etc.).

Next at S330, the operational parameter(s) are written to (e.g., stored in) virtual memory access device 244 via DMA transfer to memory (e.g., double data rate fourth-generation synchronous dynamic random-access (DDR4) memory). When the DMA transfer is complete, the DMA engine may inform (e.g., interrupt) the server 240 such that the server 240 can begin running analytics on the continuously updating operational parameter(s) at S340. Data from these nodes are used by the parallel processing system to run added analytics (e.g., condition-based maintenance (CBM), prognostics health monitoring (PHM), scheduled-based maintenance, and the like) using analytics engine 255 to provide long term trending and other outcomes. Thereby, maintenance personnel may be alerted of a fault condition (both critical and non-critical) that is present. Advantageously, the analytics process run on the PS side does not require that the asset be taken out of service to allow inspection.

In some embodiments, an off-board computer with a display 270, which is coupled to FPGA server 240, may be used for analytic visualization and/or post processing.

Figure 4:
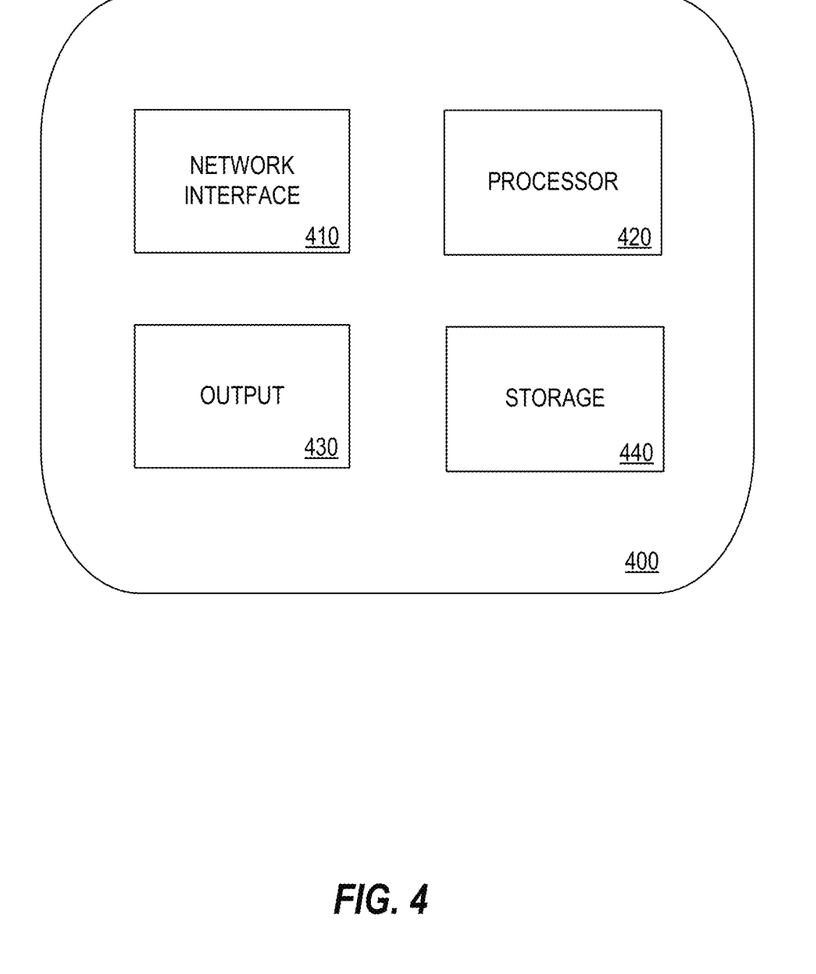
FIG. 4 is a block diagram illustrating a computing system for an unobtrusive analytics framework in accordance with an example embodiment.

FIG. 4 illustrates a computing system 400 for an unobtrusive analytics framework in accordance with an example embodiment. For example, the computing system 400 may be a database, cloud platform, streaming platform, user device, and the like. As a non-limiting example, the computing system 400 may be the cloud platform 120 shown in FIG. 1. In some embodiments, the computing system 400 may be distributed across multiple devices. Also, the computing system 400 may perform the method of FIG. 3. Referring to FIG. 4, the computing system 400 includes a network interface 410, a processor 420, an output 430, and a storage device 440 such as a memory. Although not shown in FIG. 4, the computing system 400 may include other components such as a display, an input unit, a receiver, a transmitter, an application programming interface (API), and the like, all of which may be controlled or replaced by the processor 420.

The network interface 410 may transmit and receive data over a network such as the Internet, a private network, a public network, and the like. The network interface 410 may be a wireless interface, a wired interface, or a combination thereof. The processor 420 may include one or more processing devices each including one or more processing cores. In some examples, the processor 420 is a multicore processor or a plurality of multicore processors. Also, the processor 420 may be fixed or it may be reconfigurable. The output 430 may output data to an embedded display of the computing system 400, an externally connected display, a display connected to the cloud, another device, and the like. The storage device 440 is not limited to a particular storage device and may include any known memory device such as RAM, ROM, hard disk, and the like, and may or may not be included within the cloud environment. The storage 440 may store software modules or other instructions which can be executed by the processor 420 to perform the methods described herein. Also, the storage 440 may store software programs and applications which can be downloaded and installed by a user. Furthermore, the storage 440 may store and the processor 420 may execute an application marketplace that makes the software programs and applications available to users that connect to the computing system 400.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a virtual processor implemented in field programmable gate array (FPGA) programmable logic, the virtual processor comprising a virtual version of a target system;
   a memory device storing instructions; and
   an embedded processor coupled to the FPGA programmable logic configured to execute the instructions, wherein the executed instructions cause the embedded processor to:
      capture one or more operational parameters of at least one hardware device of the target system, the at least one hardware device being external to the embedded processor and external to the FPGA programmable logic, in volatile memory of the virtual processor using an access controller configured to provide direct access to the volatile memory of the virtual processor, wherein the operational parameters comprise one or more of a temperature, speed, or fluid level of at least a portion of the at least one hardware device;
      stream the one or more operational parameters to the embedded processor;
      store the one or more operational parameters in volatile memory of the embedded processor; and
      perform in-situ monitoring using the one or more operational parameters, the performance of the in-situ monitoring comprising identifying one or more variations of the operational parameters for the at least one hardware device prior to failure of the target system.

2. The computing system of claim 1, wherein the monitoring is performed in real time while the target system is running, and
   the monitoring further comprises one or more of condition-based maintenance, prognostics health monitoring, or scheduled-based maintenance.

3. The computing system of claim 1, wherein the one or more operational parameters stored in the volatile memory of the embedded processor are continuously updated based on the operational parameters in the volatile memory of the virtual processor.

4. The computing system of claim 1, wherein the one or more operational parameters are streamed to the embedded processor using a using a direct memory access (DMA) channel.

5. The computing system of claim 1, wherein the virtual processor implemented in FPGA logic is instead implemented in Application Specific Integrated Circuit (ASIC) logic.

6. The computing system of claim 1, wherein the one or more operational parameters stored in the volatile memory of the embedded processor is written into the volatile memory via a DMA transfer.

7. The computing system of claim 1, wherein the hardware and operations of the target system are emulated in software.

8. The computing system of claim 1, wherein the one or more operational parameters are sampled at a sampling rate of a central processing unit (CPU) corresponding to the virtual processor.

9. The computing system of claim 1, wherein the system is a system-on-chip (SoC) comprising one or more parallel processing cores.

10. A computer-implemented method of forming a system-on-chip (SoC), comprising:
    implementing a virtual processor in field programmable gate array (FPGA) programmable logic, the virtual processor comprising a virtual version of a target system;
    coupling the FPGA programmable logic to an embedded processor;
    capturing one or more operational parameters of at least one hardware device of the target system, the at least one hardware device being external to the embedded processor and external to the FPGA programmable logic, in volatile memory of the virtual processor using an access controller configured to provide direct access to the volatile memory of the virtual processor, wherein the operational parameters comprise one or more of a temperature, speed, or fluid level of at least a portion of the at least one hardware device;
    streaming the one or more operational parameters to the embedded processor;
    storing the one or more operational parameters in volatile memory of the embedded processor; and
    performing in-situ monitoring using the one or more operational parameters, the performing of the in-situ monitoring comprising identifying one or more variations of the operational parameters for the at least one hardware device prior to failure of the target system.

11. The computer-implemented method of claim 10, wherein the monitoring is performed in real time while the target system is running, and
    the monitoring further comprises one or more of condition-based maintenance, prognostics health monitoring, or scheduled-based maintenance.

12. The computer-implemented method of claim 10, wherein the one or more operational parameters stored in the volatile memory of the embedded processor are continuously updated based on the operational parameters in the volatile memory of the virtual processor.

13. The computer-implemented method of claim 10, wherein the one or more operational parameters are streamed to the embedded processor using a using a direct memory access (DMA) channel.

14. The computer-implemented method of claim 10, wherein the virtual processor implemented in FPGA logic is instead implemented in Application Specific Integrated Circuit (ASIC) logic.

15. The computer-implemented method of claim 10, wherein the one or more operational parameters stored in the volatile memory of the embedded processor is written into the volatile memory via a DMA transfer.

16. The computer-implemented method of claim 10, wherein the hardware and operations of the target system are emulated in software.

17. The computer-implemented method of claim 10, wherein the one or more operational parameters are sampled at a sampling rate of a central processing unit (CPU) corresponding to the virtual processor.

18. The computer-implemented method of claim 10, wherein the embedded processor further comprises one or more processing cores.

19. The computer-implemented method of claim 10, wherein the volatile memory of the virtual processor is completely emulated in the embedded processor.

20. A non-transitory computer readable medium having stored therein instructions that when executed cause a computer to perform a method comprising:

implementing a virtual processor in field programmable gate array (FPGA) programmable logic, the virtual processor comprising a virtual version of a target system;

coupling the FPGA programmable logic to an embedded processor;

capturing one or more operational parameters of at least one hardware device of the target system, the at least one hardware device being external to the embedded processor and external to the FPGA programmable logic, in volatile memory of the virtual processor using an access controller configured to provide direct access to the volatile memory of the virtual processor, wherein the operational parameters comprise one or more of a temperature, speed, or fluid level of at least a portion of the at least one hardware device;

streaming the one or more operational parameters to the embedded processor;

storing the one or more operational parameters in volatile memory of the embedded processor; and performing in-situ monitoring using the one or more operational parameters, the performing of the in-situ monitoring comprising identifying one or more variations of the operational parameters for the at least one hardware device prior to failure of the target system.

* * * * *